UNITED STATES PATENT OFFICE.

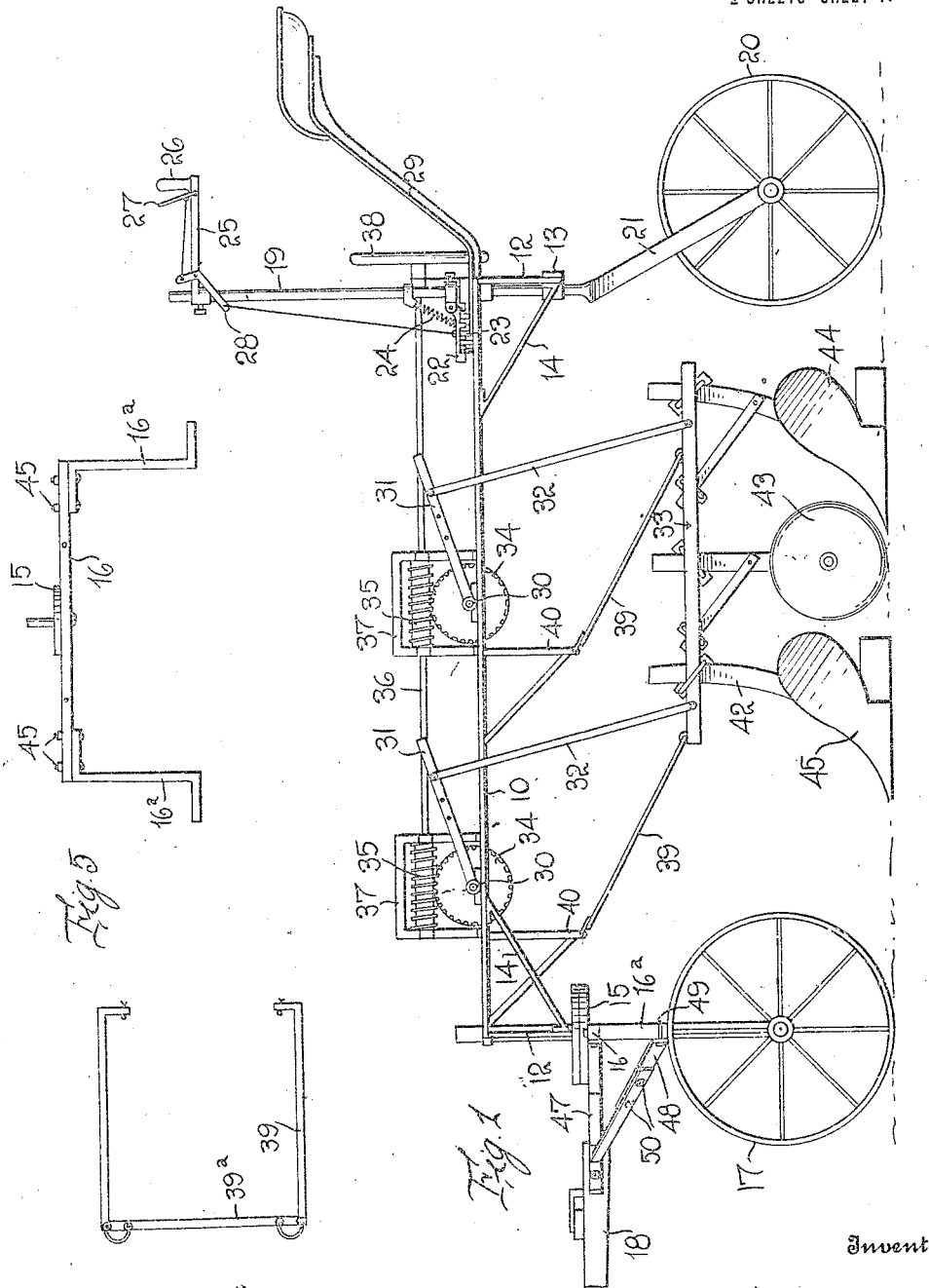

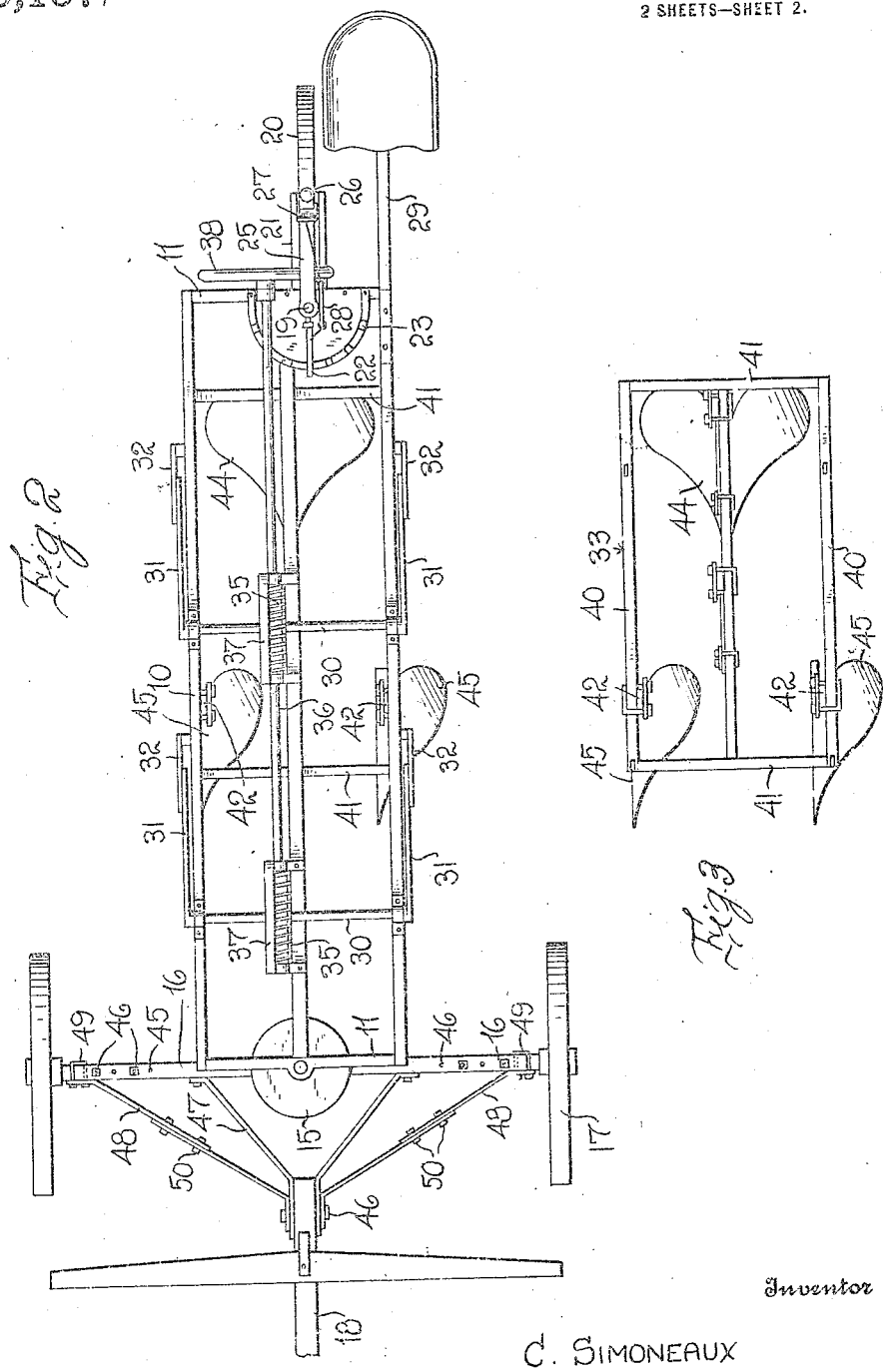

CLEMENT SIMONEAUX, OF BELLEROSE, LOUISIANA, ASSIGNOR OF ONE-HALF TO JOHN W. NEWCHURCH, OF NEW ORLEANS, LOUISIANA.

THREE-WHEELED CULTIVATOR.

1,229,157.  Specification of Letters Patent.  Patented June 5, 1917.

Application filed September 5, 1916. Serial No. 118,473.

*To all whom it may concern:*

Be it known that I, CLEMENT SIMONEAUX, a citizen of the United States, residing at Bellerose, in the parish of Assumption and State of Louisiana, have invented certain new and useful Improvements in Three-Wheeled Cultivators, of which the following is a specification, reference being had to the accompanying drawings.

My invention relates to cultivators and particularly to three wheeled riding cultivators.

One object of my invention is the provision of a very simple and easily operated riding cultivator in which the cultivator shovels or other ground engaging members are mounted upon a floating frame, and in which these connections provide a particularly effective means for raising or lowering the frame to thereby adjust the depth of cut of the ground engaging members or whereby to lift the cultivator out of operative position.

A further object in this connection is to provide for longitudinal adjustment of the cultivators on the floating frame, and a further object is to provide means whereby lateral sluing of the cultivator will be prevented, this being particularly valuable on side hills and acting against the shear of the cultivator shovels.

Other objects will appear in the course of the following description.

My invention is illustrated in the accompanying drawings, wherein:

Figure 1 is a side elevation of a cultivator constructed in accordance with my invention;

Fig. 2 is a top plan view;

Fig. 3 is a top plan view of the floating frame;

Fig. 4 is a top plan view of the links 39; and

Fig. 5 is a front elevation of the arched axle.

Referring to these figures, it will be seen that I provide a main frame comprising longitudinally extending beams 10 and transverse beams 11, these being connected to each other and braced from each other in any suitable manner. At the forward and rear ends of the frame there are provided the downwardly extending members 12, and the transverse beams 13, connecting said members and these downwardly extending end portions of the cultivator frame are braced by upwardly extending inclined braces 14 which are attached to the beams 10 at their upper ends.

The forward end of the frame is provided with any suitable bolster operating over a fifth wheel 15 mounted upon the arched axle 16, which axle carries the forward wheels 17. A tongue 18 is operatively connected to the axle, the tongue being provided with the usual draft connections.

The rear end of the frame is supported upon a shaft 19, which at its lower end is bifurcated to support the rear wheel 20, the arms 21 being inclined slightly downward and rearward. The shaft 19 passes through suitable bearings carried by the upper and lower members 11 and 13 respectively and carries an arm 22 urged downward against a rack 23 by means of a spring 24. Mounted upon the upper end of the shaft 19 is a radially extending lever 25 having a handle 26, and operatively connected to the latch 22 which engages the rack 23 is a hand grip 27 which, when forced toward the handle 26 will release the latch from its engagement with the arcuate rack. The hand grip 27 is connected to said latch by rods or other like connections extending to and from a bell crank lever 28. The handle 25 may be vertically adjusted upon the shaft 19 by means of a set screw. Mounted upon the rear end of the frame is a seat supporting bar 29 carrying a rearwardly extending seat disposed in convenient relation to the handle 25.

Extending transversely of the frame and supported in suitable bearings on the beams 10 are the forward and rear shafts 30, each shaft having rearwardly projected arms 31 at its extremities. Extending from these arms are the downwardly and rearwardly extending lifting links 32, and arranged substantially in parallelism, these links being in turn connected to a rectangular frame 33 normally disposed below the level of the main frame and constructed to support the cultivator shovels, plows or other ground working elements. For the purpose of rotating the shafts 30, each shaft 30 is provided with a gear wheel 34 engaged by a corresponding worm 35 mounted upon a worm shaft 36, this shaft being mounted in suitable bearings carried by the brackets 37 mounted upon the main frame, and this shaft extending rearward and being provided at its rear end with a hand wheel 38 which is disposed in convenient relation with the seat. It is obvious that when this shaft 36 is rotated in one direction the frame 33 will be raised and when rotated in the other direction the frame 33 will be depressed. Draft links 39 with cross bars 39ª are pivotally attached to brackets 40 depending from the main frame and these links are pivotally connected to the floating frame adjacent opposite ends of the frame and act to transmit the draft of the main frame to the folding frame. The draft links 39 are also arranged substantially in parallelism.

The floating frame 33 comprises a plurality of longitudinally extending beams connected by cross beams 41 and the standards of the various plows, harrow disks, cultivator shovels, etc., may be engaged with these beams by bolts or other suitable connections. I have shown, for instance, cultivator shovels 45, each being provided with a standard 42, this standard being held in place upon the corresponding beam 40 by means of bolts and clips. The harrow disk 43 is in turn mounted upon a standard and engaged with a middle beam of the floating frame by means of suitable clips and is provided with a brace clipped to this middle beam. A cultivator shovel 44 is mounted in like manner upon this middle beam.

The use of the cultivator will be obvious to all skilled in the art. Its advantages are that the floating frame is adapted to ride freely over the ground by reason of the linked connection of the arms 31 and the flexible draft connections 39. The floating frame may be raised, lowered or vertically adjusted by rotating the hand wheel 38. By rotating the shaft 19 the steering may be assisted or the wheel 20 may be set at a certain predetermined angle to the line of draft so as to resist the tendency of the frame to move laterally under the shearing action of the plows or cultivator shovels, thus the frame may be held on a straight course, even on a side hill.

In order to provide for increasing or decreasing the distance between the wheels 17 I preferably form the arched axle as illustrated in Fig. 5, that is with the main body 16 and the depending portions 16ª which are laterally adjustable upon the main body by means of bolts 45, insertible through a plurality of bolt holes 46 (see Fig. 2). By this means the downwardly extending portion 16ª may be adjusted so as to space the wheels a distance of twenty-four or forty-eight inches. The tongue 18 is pivotally connected to braces 47 which extend rearward and in divergent relation and are bolted to the body 16 of the arched axle and the pivot bolt 46 also passes through the forward section of a sectional brace 48, there being two of these braces 48, the outer ends being formed to lie against the front faces of the downwardly extending portion 16ª of the arched axle and to be held thereto by means of U-bolts 49. The sections of the braces 48 are slidable upon each other and held in adjusted relation by nuts and bolts 50.

It will be noted with regard to the links 39 that these links are hingedly connected to the brackets 40 and hingedly connected to eyes on the floating frame 33. These links 39 prevent the floating frame 33 from shifting laterally but permit the frame to rise and fall.

In the actual manufacture of this device, it will in ordinary circumstances have the following dimensions: The main frame will be about forty-eight inches long and twelve inches wide and the floating frame will be about half the length of the main frame but have the same width. The main frame will be disposed about twenty-eight inches above the ground.

Having described my invention, what I claim is:

In a cultivator of the character described, a main wheel-supported frame, a plurality of transverse shafts on the main frame, means for rotating said shaft in unison and in the same general direction and at substantially the same axial speed, arms extending upwardly and rearwardly from the shafts and arranged substantially in parallelism, an auxiliary frame adapted to carry ground engaging elements, lifting connections interposed between the arms and the auxiliary frame, said connections extending downwardly and rearwardly substantially in parallelism, and draft links interposed between the opposite end portions of the auxiliary frame and the main frame, said draft links extending upwardly and forwardly and arranged substantially in parallelism.

In testimony whereof I hereunto affix my signature in the presence of two witnesses.

CLEMENT SIMONEAUX.

Witnesses:
E. A. JANSEN,
ULYSSES D. CHABERT.